US012509954B2

(12) United States Patent
Le

(10) Patent No.: US 12,509,954 B2
(45) Date of Patent: Dec. 30, 2025

(54) SEAL LIFE ENHANCEMENT FOR ROTATING CONTROL DEVICE

(71) Applicant: WEATHERFORD TECHNOLOGY HOLDINGS, LLC, Houston, TX (US)

(72) Inventor: Tuong T. Le, Katy, TX (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 73 days.

(21) Appl. No.: 18/422,064

(22) Filed: Jan. 25, 2024

(65) Prior Publication Data

US 2025/0237115 A1    Jul. 24, 2025

Related U.S. Application Data

(60) Provisional application No. 63/623,118, filed on Jan. 19, 2024.

(51) Int. Cl.
*E21B 33/00* (2006.01)
*F16J 15/3284* (2016.01)

(52) U.S. Cl.
CPC ............ *E21B 33/00* (2013.01); *F16J 15/3284* (2013.01)

(58) Field of Classification Search
CPC ...... E21B 33/02; E21B 33/035; E21B 33/076; F16J 15/3284
See application file for complete search history.

(56) References Cited

U.S. PATENT DOCUMENTS

| 2,842,162 | A |   | 7/1958  | Schwegman |             |
|-----------|---|---|---------|-----------|-------------|
| 3,666,329 | A |   | 5/1972  | Jean      |             |
| 4,383,577 | A |   | 5/1983  | Pruitt    |             |
| 5,080,183 | A | * | 1/1992  | Schumacher| E21B 10/24  |
|           |   |   |         |           | 175/371     |
| 6,017,198 | A | * | 1/2000  | Traylor   | E21B 43/129 |
|           |   |   |         |           | 417/539     |
| 6,109,618 | A |   | 8/2000  | Dietle    |             |
| 7,159,669 | B2|   | 1/2007  | Bourgoyne et al. |      |
| 7,717,169 | B2|   | 5/2010  | Williams  |             |
| 7,827,903 | B2|   | 11/2010 | Tupper    |             |
| 7,918,291 | B2|   | 4/2011  | Williams  |             |
| 8,505,652 | B2|   | 8/2013  | Williams et al. |       |

(Continued)

OTHER PUBLICATIONS

Weatherford, "SeaShield Rotating Control Devices," product brochure, dated 2016, 16 pages.

*Primary Examiner* — Shane Bomar
(74) *Attorney, Agent, or Firm* — Smith IP Services, P.C.

(57) ABSTRACT

A rotating control device can include a groove formed on a housing, and an elastomeric ring isolating inner and outer portions of the groove, the elastomeric ring permitting fluid communication between the inner and outer portions of the groove in response to a pressure differential from the inner to the outer portion of the groove. A method can include forming a circumferentially extending groove, providing fluid communication between the groove and an annular area isolated between rotary seals, and positioning an elastomeric ring in the groove, the elastomeric ring preventing fluid flow from an exterior of the groove to the annular area, and permitting fluid flow from the annular area to the exterior of the groove. Another rotating control device can include an elastomeric ring in a groove, and a passage in a housing that provides fluid communication between the groove and an annular area between rotary seals.

19 Claims, 5 Drawing Sheets

(56) References Cited

U.S. PATENT DOCUMENTS

| | | |
|---|---|---|
| 8,574,196 B2 | 11/2013 | Stammen et al. |
| 8,844,652 B2 | 9/2014 | Sokol et al. |
| 8,881,843 B2 | 11/2014 | Todd et al. |
| 9,845,879 B2 | 12/2017 | Dietle et al. |
| 2008/0296016 A1* | 12/2008 | Hughes .................. E21B 47/01 166/250.01 |
| 2011/0315404 A1* | 12/2011 | Bailey .................. E21B 33/085 166/387 |
| 2013/0233556 A1* | 9/2013 | Boyd .................. E21B 33/085 166/387 |
| 2015/0218889 A1* | 8/2015 | Carroll .................. F16J 15/164 148/563 |
| 2015/0376970 A1* | 12/2015 | Hughes .................. E21B 33/03 166/84.1 |
| 2016/0334018 A1 | 11/2016 | Travis et al. |
| 2016/0356382 A1* | 12/2016 | Dietle ................ F16L 27/0828 |
| 2018/0163493 A1* | 6/2018 | Le .......................... E21B 23/03 |
| 2020/0232297 A1* | 7/2020 | Dietrich ............... E21B 33/085 |
| 2020/0263501 A1* | 8/2020 | Doud ........................ F16J 9/14 |

* cited by examiner

SEAL LIFE ENHANCEMENT FOR ROTATING CONTROL DEVICE

CROSS-REFERENCE TO RELATED APPLICATION

This application claims the benefit of the filing date of U.S. provisional application No. 63/623,118 filed on 19 Jan. 2024. The entire disclosure of the prior application is incorporated herein by this reference in its entirety for all purposes.

BACKGROUND

This disclosure relates generally to equipment utilized and operations performed in conjunction with a subterranean well and, in an example described below, more particularly provides for enhanced seal life in a rotating control device.

A rotating control device is used in well operations to isolate a well annulus from the atmosphere. The rotating control device typically includes one or more seals that seal against a tubular string extending through the rotating control device. These seals are typically rotatable with the tubular string relative to an outer housing that contains the rotating control device. Other terms used to refer to a rotating control device include rotating diverter, rotating control head and pressure control device.

It will, therefore, be readily appreciated that improvements are continually needed in the arts of designing, constructing and utilizing rotating control devices. Such improvements may be used in a wide variety of different types of well operations, including but not limited to managed pressure drilling, under balanced drilling and overbalanced drilling.

DETAILED DESCRIPTION

Figure 1:
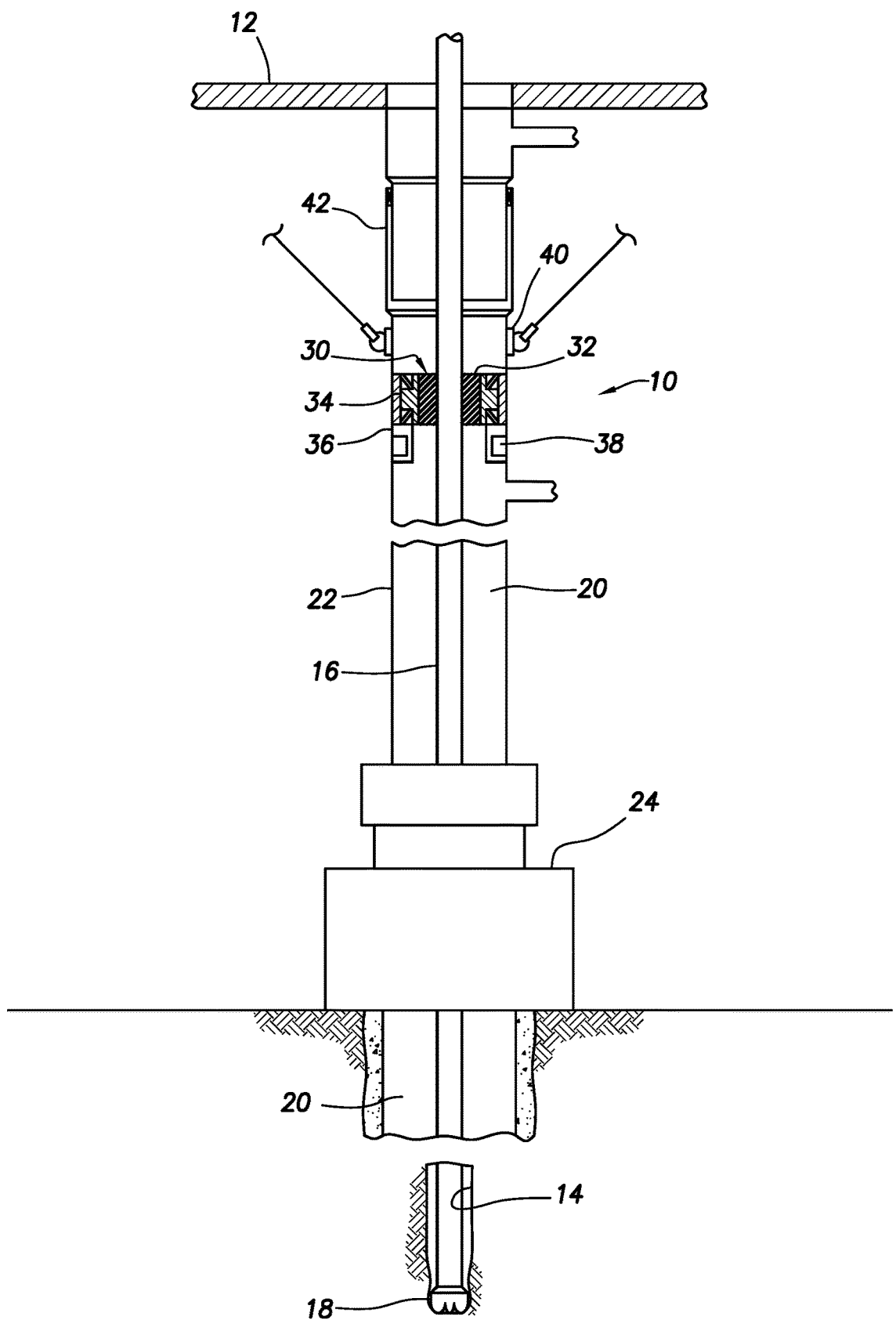
FIG. 1 is a representative partially cross-sectional view of an example of a well system and associated method which can embody principles of this disclosure.

Representatively illustrated in FIG. 1 is a system 10 for use with a subterranean well, and an associated method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a wellbore 14 is being drilled from a water-based rig 12. A tubular string 16 (such as, a drill string) having a drill bit 18 connected at a distal end thereof is deployed into the wellbore 14 to further drill the wellbore. The tubular string 16 may be rotated from the surface (for example, using a rotary table of the rig 12), and/or a mud motor may be connected in the tubular string to rotate the drill bit 18 in response to fluid flow through the tubular string.

An annulus 20 surrounds the tubular string 16 in the wellbore 14, and the annulus also surrounds the tubular string in a riser string 22 extending from a subsea wellhead installation 24 to the rig 12. It is desired in this example to isolate the annulus 20 in the wellbore 14 from the atmosphere at the surface, so that pressure in the wellbore can be readily and accurately controlled.

For this purpose, a rotating control device 30 is installed in the riser string 22. The rotating control device 30 includes one or more seals 32 that seal against an outer surface of the tubular string 16.

The seals 32 are supported by a bearing assembly 34 that allows the seals to rotate with the tubular string 16 relative to an outer housing 36 connected as part of the riser string 22. A latch assembly 38 releasably secures the rotating control device 30 in the outer housing 36.

As depicted in FIG. 1, the outer housing 36 is connected in the riser string 22 below a tensioner ring 40 and a slip joint 42. In other examples, the outer housing 36 could be positioned above the tensioner ring 40, and/or the slip joint 42 may not be used. In further examples, the rotating control device 30 may be used with a land based rig, in which case the outer housing 36 could be connected above a wellhead at the surface. Thus, the scope of this disclosure is not limited to any particular details of the system 10 or the rotating control device 30 as depicted in FIG. 1 or as described herein.

Since the seals 32 are able to rotate relative to the outer housing 36, rotary seals 40 (not shown in FIG. 1, see FIGS. 2-4) are used to seal between an inner barrel on which the seals 32 are mounted and an outer barrel that in use is fixed to the outer housing 36 by the latch assembly 38. As described more fully below, the rotating control device 30 includes improvements that extend a useful life of the rotary seals 40, thereby reducing a need to periodically retrieve the rotating control device from the riser string 22 for maintenance, which is time consuming and expensive.

Figure 2:
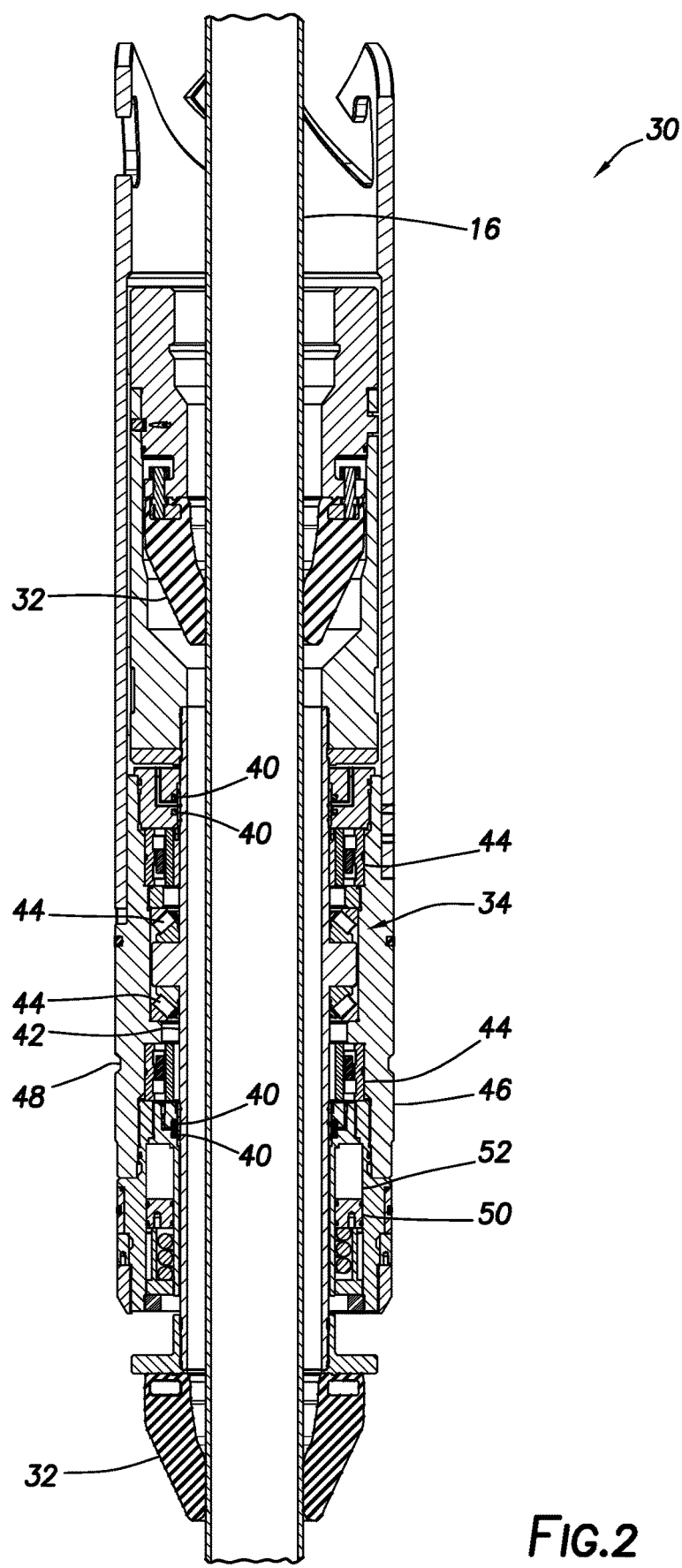
FIG. 2 is a representative cross-sectional view of an example of a rotating control device.

Referring additionally now to FIG. 2, a cross-sectional view of an example of the rotating control device 30 is representatively illustrated. The FIG. 2 rotating control device 30 may be used with the FIG. 1 system 10 and method, or it may be used with other systems and methods. For convenience, the rotating control device 30 is described below as it may be used with the FIG. 1 system 10 and method.

As depicted in FIG. 2, the tubular string 16 extends axially through the rotating control device 30. Two annular seals 32 sealingly engage an outer surface of the tubular string 16. The seals 32 are mounted to an inner barrel 42.

Bearings 44 of the bearing assembly 34 permit the inner barrel 42 and the seals 32 to rotate relative to an outer barrel 46. In this example, a circumferential latch groove 48 is formed on the outer barrel 46 for engagement by the latch assembly 38 (see FIG. 1) to releasably secure the rotating control device 30 in the outer housing 36.

Rotary seals 40 are carried in the outer barrel 46 for sealing engagement with the inner barrel 42. In this example, one set of two rotary seals 40 is positioned above the bearings 44, and another set of two rotary seals 40 is positioned below the bearings. Other numbers and/or positions of rotary seals may be used in other examples.

Since the rotary seals 40 seal against an outer surface of the inner barrel 42 as it rotates relative to the outer barrel 46, the rotary seals are subject to increased wear. In addition, this wear will be exacerbated if excessive pressure differentials are created across the rotary seals 40 in use.

In the FIG. 2 example, a pressure compensator 50 is used to pressurize lubricant 52 for the bearings 44 to somewhat greater than well pressure in the annulus 20 (see FIG. 1) below the rotating control device 30. Thus, excessive pressure differentials across the lower set of rotary seals 40 are not expected.

The upper set of rotary seals 40 can in some situations experience relatively large pressure differentials, since the lubricant 52 on a lower side of the seals 40 is at somewhat greater than wellbore pressure and an upper side of the seals 40 is at atmospheric pressure. For this reason, the rotating control device 30 includes features that extend the useful life of the upper set of rotary seals 40. However, the scope of this disclosure is not limited to any particular reason for extending the useful life of the rotary seals 40, or to any particular conditions or configuration of the rotary seals in use.

Figure 3:
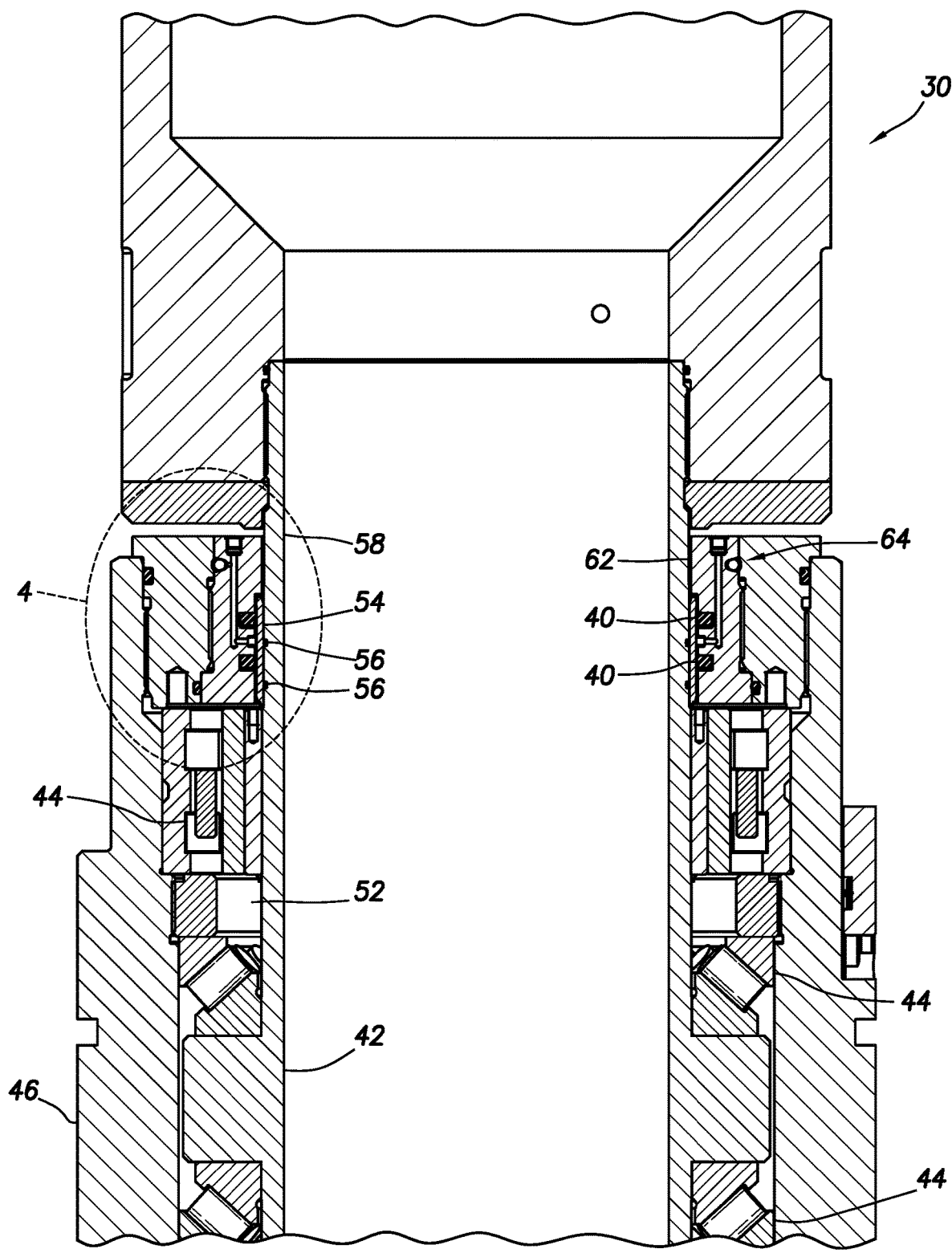
FIG. 3 is a representative cross-sectional view of an example of an upper rotary seal section of the rotating control device.

Referring additionally now to FIG. 3, a cross-sectional view of a section of the rotating control device 30 including the upper set of rotary seals 40 is representatively illustrated. For clarity, the tubular string 16 is not shown in the FIG. 3 view.

In the FIG. 3 example, the inner barrel 42 includes a seal sleeve 54 carried externally thereon. Seals 56 seal radially between the seal sleeve 54 and an upper section 58 of the inner barrel 42. The seal sleeve 54 rotates with the remainder of the inner barrel 42.

The rotary seals 40 seal against a polished outer surface of the seal sleeve 54. An annular area 60 (see FIG. 4) is formed radially between the seal sleeve 54 and a seal housing 62, and axially between the rotary seals 40. This annular area 60 is preferably filled with a lubricant (such as grease). The annular area 60 is exposed to pressure on an interior of the seal housing 62 between the rotary seals 40.

In one beneficial feature of the rotating control device 30, a pressure relief device 64 is provided in the seal housing 62. As described more fully below, the pressure relief device 64 prevents a build up of excessive pressure between the rotary seals 40.

Figure 4:
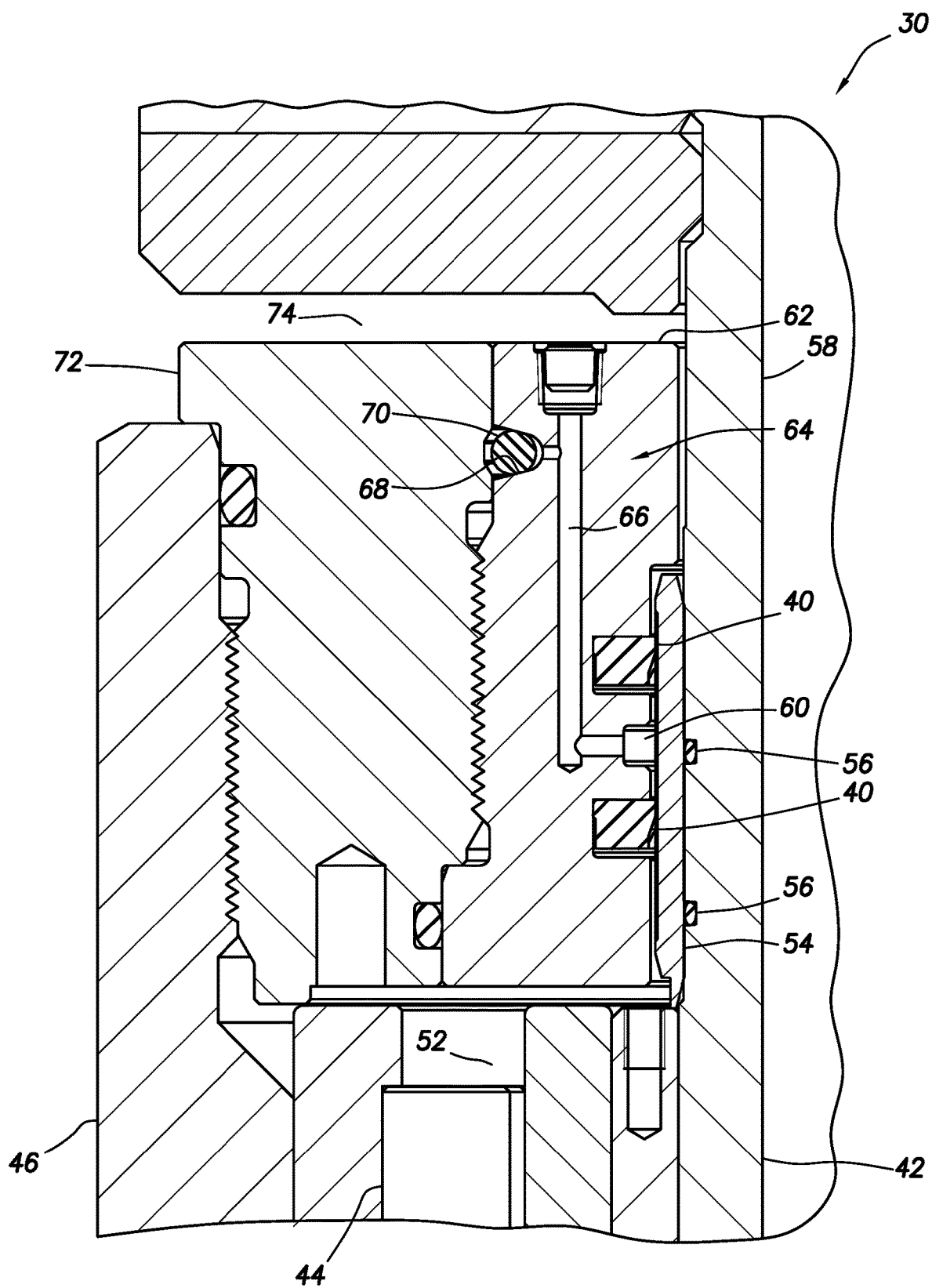
FIG. 4 is an increased scale representative cross-sectional view of one side of the FIG. 3 upper rotary seal section.

Referring additionally now to FIG. 4, a cross-sectional view of the seal housing 62 and pressure relief device 64 area on one side of the rotating control device 30 is representatively illustrated. In this view, details of the pressure relief device 64 are more clearly visible.

The FIG. 4 pressure relief device 64 may be used in the rotating control device 30, or it may be used in other types of rotating control devices. For convenience, the pressure relief device 64 is described below as it may be used with the rotating control device 30.

In the FIG. 4 example, features of the pressure relief device 64 are formed in the seal housing 62. In other examples, the pressure relief device 64 may be completely or partially formed in another component of a rotating control device.

As depicted in FIG. 4, the pressure relief device 64 includes a passage 66 formed in the seal housing 62. The passage 66 provides for communication between the annular area 60 and an annular groove 68 formed on the seal housing 62.

An elastomeric ring 70 is positioned in the groove 68. However, unlike a conventional o-ring seal, the elastomeric ring 70 is not sealed against a structure 72 radially outwardly surrounding the groove 68. Instead, the elastomeric ring 70 is able to radially outwardly displace relative to the groove 68, in response to a pressure increase in an inner portion of the groove.

In this manner, the elastomeric ring 70 permits flow from the annular area 60 to a relatively low pressure area 74 above the seal housing 62 (corresponding to atmospheric pressure in the riser string 22 above the rotating control device 30 in the FIG. 1 system 10) via the passage 66 and the groove 68. However, the elastomeric ring 70 prevents flow from the relatively low pressure area 74 to the annular area 60 via the groove 68 and passage 66.

When a sufficient pressure differential exists from the annular area 60 to the low pressure area 74, the elastomeric ring 70 will expand radially outward and permit flow from the annular area 60 to the low pressure area 74. When the sufficient pressure differential does not exist, or there is a pressure differential from the low pressure area 74 to the annular area 60, the elastomeric ring 70 will retract radially into, and sealingly engage, the groove 68 and thereby prevent flow from the low pressure area 74 to the annular area 60. Thus, the elastomeric ring 70 prevents fluid flow from an exterior of the groove 68 to the annular area 60, and the elastomeric ring 70 permits fluid flow from the annular area 60 to the exterior of the groove 68.

Figure 5:
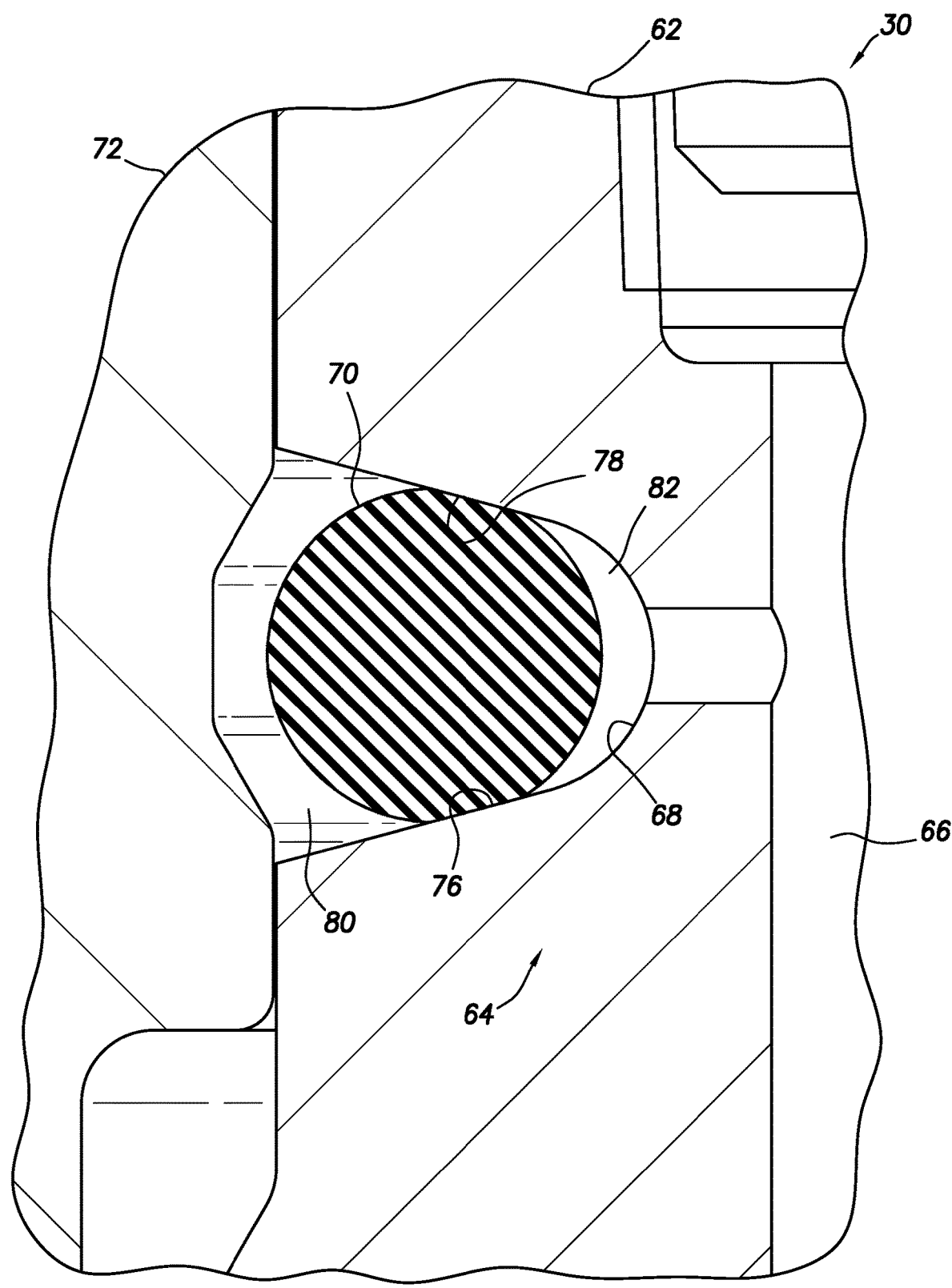
FIG. 5 is a further increased scale representative cross-sectional view of a pressure relief device in the upper rotary seal section.

Referring additionally now to FIG. 5, a further enlarged cross-sectional view of the groove 68 and elastomeric ring 70 of the pressure relief device 64 is representatively illustrated. In this view, the manner in which the ring 70 sealingly engages opposite sides 76, 78 of the groove 68 can be more clearly seen.

As depicted in FIG. 5, the elastomeric ring 70 contacts both of the opposite sides 76, 78 of the groove 68. The sides 76, 78 converge in a radially inward direction. Thus, a pressure differential from an outer portion 80 of the groove 68 toward an inner portion 82 of the groove will tend to bias the ring 70 into increased sealing contact with the sides 76, 78 of the groove, thereby preventing flow from the outer portion 80 to the inner portion 82.

However, when a sufficient pressure differential is present from the inner portion 82 toward the outer portion 80 of the groove 68, the ring 70 will expand radially outward. Due to the outward expansion of the ring 70, it will no longer sealingly contact at least one of the sides 76, 78 of the groove 68, and will thereby allow flow from the inner portion 82 to the outer portion 80 of the groove.

This relief of excessive pressure from between the rotary seals 40 via the passage 66 and elastomeric ring 70 of the pressure relief device 64 will prevent premature failure of the rotary seals and the resulting need to retrieve the rotating control device 30 for repair. The pressure relief device 64 accomplishes this result without requiring complex failure prone mechanisms.

It may now be fully appreciated that the above disclosure provides significant advancements to the arts of designing, constructing and utilizing rotating control devices for use with subterranean wells. In examples described above, the rotating control device 30 is provided with the pressure relief device 64 that conveniently and economically prevents excessive pressure build up between the rotary seals 40.

The above disclosure provides to the art a rotating control device 30 for use with a subterranean well. In one example, the rotating control device 30 can comprise: an annular groove 68 formed on a housing 62 in the rotating control device 30; and an elastomeric ring 70 disposed in the groove 68 and isolating an inner portion 82 of the groove 68 from an outer portion 80 of the groove 68. The elastomeric ring 70 is configured to permit fluid communication between the inner and outer portions 82, 80 of the groove 68 in response to a pressure differential from the inner portion 82 of the groove 68 to the outer portion 80 of the groove 68.

The elastomeric ring 70 may be further configured to displace out of sealing contact with the groove 68 in response to the pressure differential.

The rotating control device 30 may also include a passage 66 providing fluid communication between the inner portion 82 of the groove 68 and an annular area 60. The annular area 60 may be disposed axially between first and second rotary seals 40. The annular area 60 may be disposed radially between an inner barrel 42 and an outer barrel 46, with the inner barrel 42 being rotatable relative to the outer barrel 46.

The elastomeric ring 70 may be further configured to displace radially in the groove 68 in response to the pressure differential.

The elastomeric ring 70 may seal against opposite sides 76, 78 of the groove 68. The elastomeric ring 70 may be configured to displace out of sealing contact with at least one of the sides 76, 78 in response to the pressure differential.

Also provided to the art by the above disclosure is a method for use with a subterranean well. In one example, the method can comprise: forming a circumferentially extending groove 68 on a housing 62 of the rotating control device 30; providing fluid communication between the groove 68 and an annular area 60 isolated between first and second rotary seals 40; and positioning an elastomeric ring 70 in the groove 68, the elastomeric ring 70 preventing fluid flow from an exterior of the groove 68 to the annular area 60, and the elastomeric ring 70 permitting fluid flow from the annular area 60 to the exterior of the groove 68.

The forming step may include forming the groove 68 on an exterior surface of the housing 62. The annular area 60 may be exposed to an interior of the housing 62.

The providing step may include forming a passage 66 through the housing 62 between the groove 68 and the annular area 60.

The permitting fluid flow step may include the elastomeric ring 70 displacing radially in the groove 68.

The permitting fluid flow step may include the elastomeric ring 70 displacing out of contact with at least one side 76, 78 of the groove 68.

An inner barrel 42 of the rotating control device 30 may rotate relative to the first and second rotary seals 40 and the housing 62.

The annular area 60 may be disposed radially between the inner barrel 42 and the housing 62.

Another rotating control device 30 for use with a subterranean well described above can comprise: an annular groove 68 formed on a housing 62 in the rotating control device 30; an elastomeric ring 70 disposed in the groove 68; and a passage 66 in the housing 62 that provides fluid communication between the groove 68 and an annular area 60 disposed between first and second rotary seals 40.

The elastomeric ring 70 may permit fluid flow from the passage 66 via the groove 68, and the elastomeric ring 70 may prevent fluid flow into the passage 66 via the groove 68.

The elastomeric ring 70 may isolate an inner portion 82 of the groove 68 from an outer portion 80 of the groove 68. The elastomeric ring 70 may be configured to permit fluid communication between the inner and outer portions 82, 80 of the groove 68 in response to a pressure differential from the inner portion 82 of the groove 68 to the outer portion 80 of the groove 68.

The elastomeric ring 70 may be configured to displace out of sealing contact with the groove 68 in response to the pressure differential. The elastomeric ring 70 may be configured to displace radially in the groove 68 in response to the pressure differential.

The elastomeric ring 70 may seal against opposite sides 76, 78 of the groove 68. The elastomeric ring 70 may be configured to displace out of sealing contact with at least one of the sides 76, 78 in response to the pressure differential.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," "upward," "downward," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A rotating control device for use with a subterranean well, the rotating control device comprising:
   an annular groove formed on a housing in the rotating control device; and
   an elastomeric ring disposed in the groove and isolating an inner portion of the groove from an outer portion of the groove, the elastomeric ring being configured to permit fluid communication between the inner and outer portions of the groove in response to a pressure differential from the inner portion of the groove to the outer portion of the groove,
in which the elastomeric ring is further configured to displace out of sealing contact with the groove in response to the pressure differential.

2. The rotating control device of claim 1, further comprising a passage providing fluid communication between the inner portion of the groove and an annular area.

3. The rotating control device of claim 2, in which the annular area is disposed axially between first and second rotary seals.

4. The rotating control device of claim 2, in which the annular area is disposed radially between an inner barrel and an outer barrel, and the inner barrel is rotatable relative to the outer barrel.

5. The rotating control device of claim 1, in which the elastomeric ring is further configured to displace radially in the groove in response to the pressure differential.

6. The rotating control device of claim 1, in which the elastomeric ring seals against opposite sides of the groove, and in which the elastomeric ring is configured to displace out of sealing contact with at least one of the sides in response to the pressure differential.

7. A method for use with a subterranean well, the method comprising:
forming a circumferentially extending groove on a housing of a rotating control device;
providing fluid communication between the groove and an annular area isolated between first and second rotary seals; and
positioning an elastomeric ring in the groove, the elastomeric ring preventing fluid flow from an exterior of the groove to the annular area, and the elastomeric ring permitting fluid flow from the annular area to the exterior of the groove.

8. The method of claim 7, in which forming comprises forming the groove on an exterior surface of the housing, and in which the annular area is exposed to an interior of the housing.

9. The method of claim 8, in which the providing comprises forming a passage through the housing between the groove and the annular area.

10. The method of claim 7, in which the permitting fluid flow comprises the elastomeric ring displacing radially in the groove.

11. The method of claim 7, in which the permitting fluid flow comprises the elastomeric ring displacing out of contact with at least one side of the groove.

12. The method of claim 7, in which an inner barrel of the rotating control device rotates relative to the first and second rotary seals and the housing.

13. The method of claim 12, in which the annular area is disposed radially between the inner barrel and the housing.

14. A rotating control device for use with a subterranean well, the rotating control device comprising:
an annular groove formed on a housing in the rotating control device;
an elastomeric ring disposed in the groove; and
a passage in the housing that provides fluid communication between the groove and an annular area disposed between first and second rotary seals.

15. The rotating control device of claim 14, in which the elastomeric ring permits fluid flow from the passage via the groove, and the elastomeric ring prevents fluid flow into the passage via the groove.

16. The rotating control device of claim 14, in which the elastomeric ring isolates an inner portion of the groove from an outer portion of the groove, the elastomeric ring being configured to permit fluid communication between the inner and outer portions of the groove in response to a pressure differential from the inner portion of the groove to the outer portion of the groove.

17. The rotating control device of claim 16, in which the elastomeric ring is configured to displace out of sealing contact with the groove in response to the pressure differential.

18. The rotating control device of claim 16, in which the elastomeric ring is configured to displace radially in the groove in response to the pressure differential.

19. The rotating control device of claim 16, in which the elastomeric ring seals against opposite sides of the groove, and in which the elastomeric ring is configured to displace out of sealing contact with at least one of the sides in response to the pressure differential.

* * * * *